United States Patent [19]
Hare et al.

[11] 3,806,698
[45] Apr. 23, 1974

[54] OPERATION OF A HEATING DEVICE

[75] Inventors: Alan Lawrence Hare; James Denis Groves, both of Redcar; William Stanley Watson, Stockton-on-Tees, all of England

[73] Assignee: British Titan Limited, Billingham, Teesside, England

[22] Filed: Aug. 30, 1972

[21] Appl. No.: 284,962

[30] Foreign Application Priority Data
Oct. 29, 1971 Great Britain.................... 50521/71

[52] U.S. Cl.............. 219/383, 165/133, 165/134, 174/15 R, 252/71, 313/32, 219/120, 219/121 P

[51] Int. Cl. ............................................. H05b 7/18

[58] Field of Search........... 165/133, 134; 174/15 R; 219/120, 121 P, 383; 313/32; 252/71

[56] References Cited
UNITED STATES PATENTS

| | | | |
|---|---|---|---|
| 3,050,616 | 8/1962 | Gage | 219/121 P X |
| 3,153,133 | 10/1964 | Ducati | 219/121 P |
| 3,289,022 | 11/1966 | Oberlander | 313/32 X |
| 3,291,198 | 12/1966 | Timson | 165/133 X |
| 3,294,644 | 12/1966 | Walton | 252/71 X |
| 3,360,988 | 1/1968 | Stine et al. | 219/121 P X |
| 3,580,759 | 5/1971 | Albertson et al. | 252/71 |
| 3,590,219 | 6/1971 | Painter et al. | 219/383 |
| 3,629,553 | 12/1971 | Fey et al. | 219/383 |

OTHER PUBLICATIONS

Fraas and Ozisik, Heat Transfer Design, John Wiley and Sons, Inc., New York, 1965, p. 78.

*Primary Examiner*—Leon D. Rosdol
*Assistant Examiner*—Harris A. Pitlick
*Attorney, Agent, or Firm*—Schuyler, Birch, Swindler, McKie & Beckett

[57] ABSTRACT

A method of heating a gas in which the gas is passed through an arc maintained between a pair of electrodes while cooling the electrodes by passing cooling water in contact with the surface of the electrodes which water has a heat-flux capacity of at least 100 watts. Preferably the water contains a nucleating agent for bubble formation to raise the heat-flux capacity of the water to at least 100 watts.

22 Claims, 1 Drawing Figure

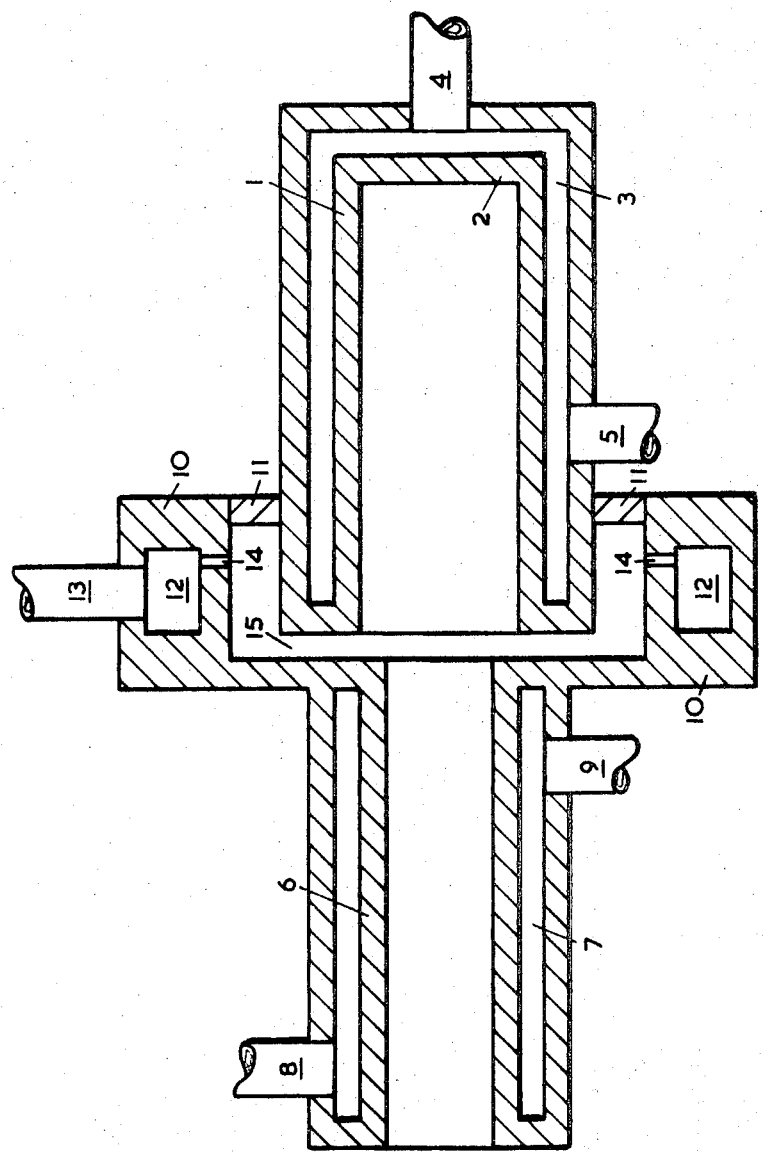

3,806,698

OPERATION OF A HEATING DEVICE

This invention relates to an improvement in the operation of a heating device in which an arc between a pair of electrodes is used to heat a stream of a gas.

In the operation of heating a gas using an arc struck between a pair of electrodes a considerable amount of heat must be dissipated otherwise electrode life is unacceptably shortened by erosion of the arc striking surface.

According to the present invention a method of heating a gas comprises passing the gas through an arc maintained between a pair of electrodes and cooling the electrodes by passing water in contact with a surface of the electrodes wherein the water has a heat flux capacity measured as described hereinafter of at least 100 watts.

According to the invention also a method of heating a gas comprises passing the gas through an arc maintained between a pair of electrodes and cooling the electrodes by passing water in contact with a surface of the electrodes which water contains a nucleating agent for bubble formation to raise the heat flux capacity of the water as measured as hereinafter described to at least 100 watts.

The method of heating as defined in either of the two immediately preceding paragraphs may be used to heat a gas which may be oxygen or an inert gas such as argon which is then mixed with a titanium tetrahalide (and with oxygen when the gas is an inert gas) to heat the reactants to a reaction temperature at which reaction between the titanium tetrahalide and oxygen occurs in the vapour phase to produce titanium dioxide.

Water as available for commercial usage often contains impurities such as dissolved carbon dioxide and other gases, which reduce the critical heat flux of the water. Critical heat flux is the maximum rate at which heat can be transferred from a solid surface to the water without causing a film of vapour to be formed on the surface. This film of vapour acts as an insulator and prevents further heat transference with the result that heat build-up in the solid occurs which can damage the solid by erosion. Various methods are known to reduce erosion and to reduce the tendency for the production of a film of vapour but it would be advantageous to reduce erosion or this tendency further.

In the present invention improvements in erosion rates are obtained by using cooling water that has a heat flux capacity of at least 100 watts as measured as defined hereinafter.

The test to measure and define the heat flux capacity is as follows:

Immerse a platinum wire (purity 99.985 at least) 0.002 inch in diameter in the water to be tested. The wire is connected to two electrically conducting supports and is mounted to have a length of 3 inches between its points of electrical contact. The supports are supplied with alternating current through a variable voltage regulator, and an ammeter. A voltmeter is connected to measure the applied voltage to the wire. The voltage is increased slowly (not greater than 1 volt per second) until the wire burns out. The burn-out voltage and current (amps) are noted. The product (burn-out voltage X amps) is the heat flux capacity referred to hereinbefore.

Usually it will be found necessary to treat the water available to increase its heat flux capacity to at least 100 watts prior to its use as cooling water. The addition to the water of a nucleating agent for bubble formation has the effect of reducing a tendency to the formation of a vapour film on the electrode surface by promoting the formation of small bubbles of gas in the water rather than a continuous film. Due to the very high localised heat fluxes in arc heating devices it is essential to employ nucleate boiling to prevent excessive erosion in the device. The boiling should produce small bubbles.

The simple test described hereinbefore enables the choice of nucleating agent to be made easily by adding a small quantity of a particular material to water under test and determining the effect on the heat flux capacity. The effect of different quantities of the agent is thus easily and quickly determined. Also the effect of pH on the heat flux capacity of the water treated in a particular manner is observable by making an appropriate acid or alkali addition to adjust the pH to the desired value.

Typical nucleating agents for bubble formation that are useful are the organic aliphatic alcohols such as ethanol, propanol or butanol, certain organic acids such as tannic acid, ketones, such as methyl ethyl ketone and mineral acid salts such as magnesium sulphate, aluminium sulphate and polyphosphates and hydrazine. Amounts of alcohols and ketones which may be used are usually within the range 0.1 to 10 percent by weight of water and the amounts of the other agents which may be used are usually within the range 5 to 1,000 p.p.m. by weight. Mixtures of two or more different nucleating agents may be used if desired. When hydrazine, a polyphosphate, magnesium sulphate or aluminium sulphate is used then it is preferred to heat the treated water prior to use for cooling to a temperature of at least 50°C, usually at least 60°C in order that the effect of the agent is increased.

The amounts of the nucleating agent is usually only small, but will, of course, depend on the quality of the starting water determined by the test hereinbefore defined. Magnesium sulphate mixed with butanol is a particular useful nucleating agent as is aluminium sulphate.

The water used to cool the electrodes should have a low conductivity and preferably should have as maximum electrical conductivity of 250 micro mhos per centimetre. However, water having an electrical conductivity greater than this can be used but this will usually necessitate the use of longer electrically non-conducting pipes adjacent the electrodes.

The method of the invention is particularly useful when the arc is formed by direct current between an anode and a cathode although advantages are obtained with an arc formed by alternating current. Usually the electrodes are in the form of tubular members, the anode being situated at the exit end of the device and the gas introduced through the gap between the two electrodes. It has been found desirable where the electrode near the exit of the device is the anode to provide a cooling water flow counter-current to the gas.

Usually the cooling water will flow around the outer surface of the electrode although if desired the electrode can be provided with internal channels through which the water flows. Usually the cooling water will circulate within a closed system comprising a storage vessel, cooling means and circulating pumps.

It has been found that in an arc heating device comprising in-line tubular electrodes the electrode adjacent the exit of the device suffers greater erosion during heating of the gas stream than the other electrode, whether the exit electrode be the anode or the cathode. The use of the method of the invention enables this erosion to be minimised particularly when the cooling water is arranged to flow over the cooling surface of the front electrode in the opposite direction to that of the gas to be heated.

Although the method of heating by means of an arc between electrodes can be used in a wide variety of arc heating devices such as welding torches it has been found particularly useful in the manufacture of metal oxide pigments by the vapour phase oxidation of a metal halide, for example titanium tetrahalide. In this process it is necessary to heat for example, titanium tetrachloride and oxygen to the reaction temperature at which oxidation of the titanium tetrachloride takes place in a reactor. This heating can be carried out in a number of ways, for instance, a stream of oxygen can be heated by passing through an arc maintained between a pair of electrodes which is subsequently mixed with the titanium tetrachloride vapour and excess oxygen if desired to give a temperature on mixing sufficient to cause reaction or alternatively an inert gas such as argon may be heated by passing through an arc and the heated inert gas is subsequently mixed with either or both oxygen and/or titanium tetrachloride.

One form of apparatus to be used in the method of the present invention will now be described by way of example only with reference to the accompanying drawing which is a diagrammatic section through an arc heating device.

The apparatus consists of a rear electrode 1 in the form of a cylinder closed at one end 2 and surrounded by a channel 3 through which cooling water is flowed via inlet 4 and outlet 5.

Axially aligned with the rear electrode 1 is a front cylindrical electrode 6 surrounded by a channel 7 through which cooling water is passed via inlet 8 and outlet 9.

An annular ring member 10 is carried by the electrodes 1 and 6 and has an insulating ring 11 to electrically isolate the two electrodes. A gas passage 12 is formed in this member 10 applied by a gas inlet 13 and feed holes 14 arranged tangentially are formed in the member 10 to pass the gas from the passage 12 to the gap 15 between the electrodes 1 and 6 and out of the exit electrode 6.

In operation the gas to be heated is passed through the gas inlet 13 and out of the exit electrode while a direct current is applied across the electrodes. Usually the electrode 6 is the anode and electrode 1 is the cathode. The chosen cooling water is passed through the channels 3 and 7. The water flows through channel 7 in a direction opposite to the direction of flow of the gas stream.

The invention is also illustrated in the following Examples:

EXAMPLE 1

An arc heating device as shown in the accompanying drawing was used to heat air flowing at a rate of 6,000 standard cubic feet per hour. The heating device was supplied with current at 400 amps and at a voltage of 1,000 volts and the electrodes were formed of an alloy of silver and copper containing 20 percent by weight of copper. The electrode 6 was the anode and the electrode 1 was the cathode.

Cool demineralised water was supplied to the device. The Experiments were carried out using cooling water containing different additives and prior to use the water was tested to determine the heat flux capacity. The amounts of erosion of the electrodes were measured. The results are shown in the following Table 1.

TABLE 1

| Additive | Heat flux capacity (watts) | Erosion Anode (gm/hr) | Erosion Cathode (gm/hr) | Ph | Conductivity (micro mhos per centimetre) |
|---|---|---|---|---|---|
| NONE | 45.0 | 0.72 | 0.63 | 8.5 | 6 |
| Hydrazine (15 ppm)+NaOH (to desired pH) | 111.0 | 0.17 | 0.39 | 9.3 | 66 |
| 4% Butanol + Hydrazine 18 ppm | 130 | 0.04 | 0.41 | 8.2 | 84 |
| 1% Butanol | 130 | 0.04 | 0.44 | 8.0 | 90 |
| 0.1% Butanol + MgSO₄ 20ppm | 138 | 0.03 | 0.52 | 7.6 | 158 |
| 0.1% Butanol + 40 ppm MgSO₄ | 149 | 0.016 | 0.49 | 8.7 | 180 |

The reduction in erosion when using the method of the invention is clearly apparent.

The demineralised water was prepared by taking normal domestic water and passing this through a weak acid cation exchange unit to remove calcium ions and to convert calcium carbonate to carbon dioxide. The water was then passed through a degassing tower to a strong acid cation exchange unit to remove magnesium ions. The treated water was then passed to a weakly basic anion exchange unit to remove sulphate chloride and nitrate ions. The product of such a treatment was the demineralised water used in Example 1 and 2.

EXAMPLE 2

The effect of various additions to demineralised water on the heat flux capacity were determined using the test described hereinbefore and the results are shown in Table 2.

TABLE 2

| Additive | Heat Flux capacity (watts) | pH | Conductivity (micro mhos per centimetre) |
| --- | --- | --- | --- |
| None | 45 | 8.5 | 6 |
| 80 ppm Tannic acid | 122 | 6.0 | 5.6 |
| 80 ppm Tannic acid + NaOH | 176 | 9.4 | 33 |
| 20 ppm hydrazine | 54.5 | 10.4 | 65 |
| 20 ppm hydrazine + heating to 60°C and cooling | 112 | 10.4 | 51 |
| 40 ppm sodium hexameta phosphate | 47.7 | 8.0 | 32 |
| 40 ppm sodium hexameta phosphate + heating to 60°C and cooling | 110 | 8.1 | 37 |
| 80 ppm MgSO$_4$ + 0.1% Butanol | 162 | 10.0 | 220 |

The use of the treated water in the cooling of an arc heating device reduced the amount of erosion of the electrodes as compared to the use of untreated water.

What is claimed is:

1. A method of heating a gas which comprises passing the gas through an arc maintained between a pair of electrodes and cooling the electrodes by passing water in contact with a surface of the electrodes, said water containing therein a nucleating agent for bubble formation selected from the group consisting of lower aliphatic alcohols, tannic acid, methyl ethyl ketone, magnesium sulphate, aluminum sulphate, sodium polyphosphates, hydrazine and mixtures thereof, the heat flux capacity of said water being at least 100 watts.

2. A method according to claim 1 in which the nucleating agent is a lower aliphatic alcohol.

3. A method according to claim 1 in which the nucleating agent is tannic acid.

4. A method according to claim 1 in which the nucleating agent is methyl ethyl ketone.

5. A method according to claim 1 in which the nucleating agent is magnesium sulphate.

6. A method according to claim 1 in which the nucleating agent is aluminium sulphate.

7. A method according to claim 1 in which the nucleating agent is a sodium polyphosphate.

8. A method according to claim 1 in which the nucleating agent is hydrazine.

9. A method according to claim 1 in which two or more different nucleating agents are used.

10. A method according to claim 9 in which butanol and magnesium sulphate are used.

11. A method according to claim 1 in which the water after mixing with the nucleating agent is heated to a temperature of at least 50°C and then cooled prior to use to cool the electrodes.

12. A method according to claim 11 in which said nucleating agent contains hydrazine or polyphosphate or magnesium sulphate or aluminum sulphate.

13. A method according to claim 11 in which the water is heated to at least 60°C.

14. A method according to claim 1 in which the water has an electrical conductivity of not more than 250 micro mhos per centimetre.

15. A method according to claim 1 in which the arc is formed by direct electric current.

16. A method according to claim 1 in which the arc is formed by alternating electric current.

17. A method according to claim 1 in which the water is passed around the outer surface of the electrodes.

18. A method according to claim 1 in which the water is circulated through a closed system comprising a storage vessel, cooling means for the water and circulating pump.

19. A method according to claim 1 in which the gas is oxygen.

20. A method of heating a gas which comprises establishing an electric arc between a pair of electrodes, passing the gas through the arc to heat this gas and cooling the electrodes by passing water in contact with a surface of the electrodes, said water containing a nucleating agent selected from the group consisting of hydrazine plus sodium hydroxide, butanol plus hydrazine, butanol, butanol plus magnesium sulphate, butanol plus aluminum sulphate, tannic acid and tannic acid plus sodium hydroxide in which the amount of butanol is from 0.1 to 10 percent by weight of the water and the amount of the other additive is within the range 5 to 1,000 parts per million by weight, so that the water has a heat flux capacity of at least 100 watts.

21. A method of heating a gas which comprises establishing an electric arc between a pair of electrodes, passing the gas through the arc to heat the gas and cooling the electrodes by passing cooling water in contact with a surface of the electrodes, said cooling water containing a nucleating agent selected from the group consisting of hydrazine, sodium hexametaphosphate, magnesium sulphate plus butanol and aluminum sulphate plus butanol, in which the amount of butanol is from 0.1 to 10 percent by weight of water and the amount of the other additive is from 5 to 1,000 parts per million by weight, said water having been heated to a temperature of at least 50°C. and then cooled prior to use as the cooling water so that the water has a heat flux capacity of at least 100 watts.

22. The method of claim 17 in which the inner surface of said electrode is a conduit for the gas and the water flows in a direction opposite to the direction of flow of the gas stream.

* * * * *